Feb. 24, 1931.                J. CHILOFSKY                1,793,679
                            ELECTRICIAN'S TOOL
                            Filed March 7, 1930
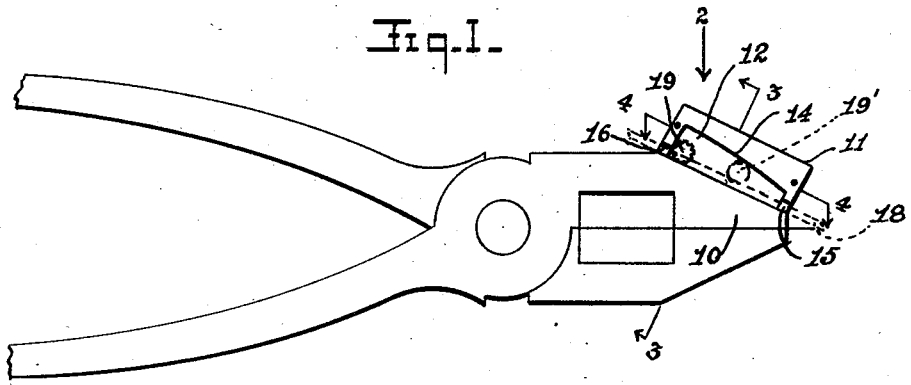
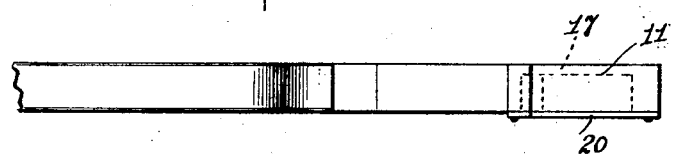
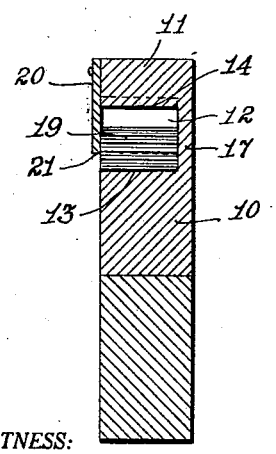
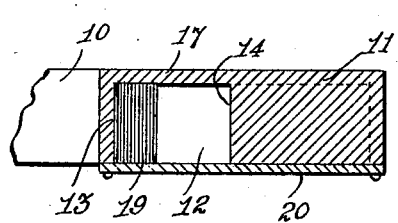
WITNESS:                                        INVENTOR
                                          Joseph Chilofsky
                                                BY
                                                ATTORNEY Patented Feb. 24, 1931

1,793,679

UNITED STATES PATENT OFFICE

JOSEPH CHILOFSKY, OF PHILADELPHIA, PENNSYLVANIA

ELECTRICIAN'S TOOL

Application filed March 7, 1930. Serial No. 433,877.

This invention relates to electricians' tools and has for an object to provide in combination with a plier improved means for engaging a fishing tape for the purpose of pulling in.

A further object of the invention is to provide a plier with an additional element embodying a chamber into which a fishing tape may be laterally inserted with a roller operating between said fishing tape and an inclined wedge surface for clamping and holding said tape.

With these and other objects in view, the invention comprises certain novel parts, elements, units, constructions, mechanical movement and functions as disclosed in the drawing, together with mechanical and functional equivalents thereof, as will be hereinafter more fully described and claimed.

In the drawing:—

Figure 1 is a view of a conventional plier shown in side elevation with the attachment connected therewith having the side retaining plate removed to show the internal construction, Figure 2 is a view of the plier and general structure in edge elevation as indicated by arrow 2 in Figure 1, Figure 3 is a transverse sectional view through the plier jaws and through the attachment taken on line 3—3 of Figure 1, and Figure 4 is a sectional view taken on line 4—4 of Figure 1.

The improved tool which forms the subject matter of this application is substantially a plier of conventional type embodying crossed and pivoted jaws, one of which the jaw 10, carries rigidly and preferably integrally therewith the present invention. This comprises an offset 11, formed upon the jaw structure with a milled or otherwise cut out part 12, the lower wall of which at 13, is substantially the original contour of the jaw 10, with an upper wall 14 inclined to the wall 13 whereby a tapered chamber is provided. At the ends, this member is under-cut at 15 and 16 so that the entire member is supported upon the jaw 10, by the wall 17. This permits the fishing tape, indicated in dotted lines at 18, in Figure 1, to be inserted laterally under the chamber 12. Within this chamber 12, a roller 19 is loosely mounted having a corrugated periphery as indicated. The proportion of this roller to the chamber is such that when it rolls toward the narrower end of the chamber as indicated in dotted lines at 19', at Figure 1, it will clamp the fishing tape in the manner indicated.

The roller 19 is held in its chamber by a plate 20, attached to the face of the offset 11, the plate stopping short at 21 of meeting the jaw 10, such proportion registering with the upper edges of the cut outs 15 and 16 so that when the plate is in position as shown more particularly at Figure 3, passage laterally into the chamber 12, under the roller 19 is unobstructed.

In use the fishing tape, indicated at 18, is merely inserted laterally into the slot provided under the lower edge of the plate 20, into the chamber 12 and under the roller 19, whereupon merely pulling upon the tool clamps the fishing tape by the wedging action of the roller 19.

As the fishing tape is drawn through, the tool may be moved along the tape by pushing, which loosens the roller from the tape permitting free movement of the tape therethrough which is again clamped by pulling action exerted upon the tool.

The invention is hereby claimed as follows:

1. An electrician's pulling tool comprising a handle section and a gripping section, said gripping section embodying an offset part having a tapered chamber therein and a passage forming part of said chamber, and a rolling gripping member within the chamber, the line of said passage extended diverging from the handle section.

2. An electrician's pulling tool comprising a handle section and a gripping section, said gripping section embodying an offset part having a tapered chamber therein and a passage forming part of said chamber, and a rolling gripping member within the chamber, the line of said passage extended diverging from the line of draft as provided by the said handle section.

In testimony whereof I have signed my name to this specification.

JOSEPH CHILOFSKY.